US007919922B2

(12) United States Patent
Lee et al.

(10) Patent No.: US 7,919,922 B2
(45) Date of Patent: Apr. 5, 2011

(54) GREEN PHOSPHOR FOR PLASMA DISPLAY PANEL AND PLASMA DISPLAY PANEL INCLUDING A PHOSPHOR LAYER FORMED OF THE SAME

(75) Inventors: Soon-Rewl Lee, Young-si (KR);
Sung-Yong Lee, Young-si (KR);
Young-Gil Yoo, Young-si (KR);
Jin-Won Kim, Young-si (KR);
Young-Kwan Kim, Young-si (KR)

(73) Assignee: Samsung SDI Co., Ltd. (KR)

( * ) Notice: Subject to any disclaimer, the term of this patent is extended or adjusted under 35 U.S.C. 154(b) by 579 days.

(21) Appl. No.: 11/901,338

(22) Filed: Sep. 17, 2007

(65) Prior Publication Data
US 2008/0074052 A1  Mar. 27, 2008

(30) Foreign Application Priority Data

Sep. 20, 2006  (KR) .................. 10-2006-0091449
Oct. 12, 2006  (KR) .................. 10-2006-0099310

(51) Int. Cl.
*H01J 17/49* (2006.01)
(52) U.S. Cl. ........ 313/586; 313/582; 313/583; 313/584; 313/585; 313/587
(58) Field of Classification Search ........................ None
See application file for complete search history.

(56) References Cited

U.S. PATENT DOCUMENTS

| 6,454,967 | B1 | 9/2002 | Im | |
| 7,423,376 | B2 * | 9/2008 | Setoguchi et al. | 313/582 |
| 7,528,537 | B2 * | 5/2009 | Imanari et al. | 313/495 |
| 2001/0003410 | A1 | 6/2001 | Haruki | |
| 2002/0041145 | A1 | 4/2002 | Yokosawa | |

FOREIGN PATENT DOCUMENTS

| EP | 1 641 014 | 3/2006 |
| JP | 2001-172626 | 6/2001 |
| JP | 2005-187587 | 7/2005 |
| WO | WO 2005/010121 | 2/2005 |

OTHER PUBLICATIONS

European Search Report for EP 07116681.3; Applicant: Samsung SDI Co., Ltd., dated Jul. 21, 2009; 8 pgs; European Patent Office.
Database WPI Week 200554 Thomson Scientific, London, GB; AN 2005-524927 XP002534709; 4 pgs.
Yokosawa, et al., Vacuum Ultraviolet Excitation Processes of $YAl_3(BO_3)_4$:R ($R=Eu^{3+}$, $Gd^{3+}$ and $Tb^{3+}$); Jpn J. Appl. Phys. vol. 42, (Sep. 2003) pp. 5656-5659.

* cited by examiner

*Primary Examiner* — Nimeshkumar D Patel
*Assistant Examiner* — Natalie K Walford
(74) *Attorney, Agent, or Firm* — Knobbe Martens Olson & Bear LLP

(57) ABSTRACT

Provided are a green phosphor for a plasma display panel (PDP) represented by Formula 1 and a PDP including a phosphor layer formed of the same:

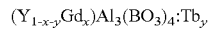

$(Y_{1-x-y}Gd_x)Al_3(BO_3)_4$:$Tb_y$   Formula 1 where $0 \leq x < 1$, $0 < y < 1$ and $0 < x+y < 1$.
The luminance saturation characteristic of a green phosphor layer can be improved using the green phosphor for a PDP according to the present embodiments, and the green phosphor can also be mixed with conventionally used green phosphors. Image quality can be improved according to a mixing rate of the green phosphor and conventionally used green phosphors since color reproduction range widens and luminance does not decrease compared to using the conventional green phosphors.

24 Claims, 4 Drawing Sheets

GREEN PHOSPHOR FOR PLASMA DISPLAY PANEL AND PLASMA DISPLAY PANEL INCLUDING A PHOSPHOR LAYER FORMED OF THE SAME

CROSS-REFERENCE TO RELATED PATENT APPLICATIONS

This application claims the benefit of Korean Patent Application Nos. 10-2006-0091449, filed on Sep. 20, 2006, and 10-2006-0099310, filed on Oct. 12, 2006, in the Korean Intellectual Property Office, the disclosures of which are incorporated herein in its entirety by reference.

BACKGROUND OF THE INVENTION

1. Field of the Invention

The present embodiments relate to a green phosphor for a plasma display panel (PDP) and a PDP including a phosphor layer formed of the same, and more particularly, to a green phosphor for a PDP having an improved luminance saturation characteristic and a PDP including a phosphor layer formed of the green phosphor.

2. Description of the Related Art

Phosphors emit light when they are exposed to energy. In general, phosphors are used in light sources such as mercury fluorescent lamps and mercury free fluorescent lamps, electron emission devices, plasma display panels (PDPs), etc. In the future, phosphors may be used for a wider range of applications as new multimedia devices are developed.

PDPs are flat panel displays that display images using light emitted by ultraviolet rays that are created by discharge of a mixture of gases including neon and xenon injected into an area between a pair of glass substrates. Visible light is created by each phosphor using resonance radiation light of xenon ion (147 nm vacuum ultraviolet rays).

$ZnSi_2O_4$:Mn (ZSM) has been widely used as a green phosphor for PDPs, and ZSM has also been used as a main constituent of a green phosphor for PDPs in combination with $YBO_3$:Tb (YBT) and $(Ba,Sr,Mg)O \cdot \alpha Al_2O_3$:Mn (BAM).

ZSM phosphors have excellent luminance, but short lifetime. Further, the surface of ZSM phosphors has a high negative polarity, thus resulting in a high discharge voltage. YBT phosphors have excellent luminance, long lifetime, and reduced discharge voltage, but poor color purity. BAM phosphors have excellent color purity and reduced discharge voltage, but short lifetime and long decay time.

ZSM phosphors can be used either alone or in combination with other phosphors to prepare a green phosphor layer for a PDP. Usually, ZSM is used alone, or as a main phosphor in combination with YBT and/or BAM. However, ZSM has luminance saturation. That is, luminance per unit sustain pulse is saturated as the number of sustain pulses increases, and a peak luminance which is a main property of PDPs decreases, and thus bright room contrast decreases.

Luminance saturation is an important factor determining gray-level and image quality. Thus, the development of a phosphor having long lifetime and excellent luminance without luminance saturation is urgently required.

SUMMARY OF THE INVENTION

The present embodiments provide a green phosphor for a plasma display panel (PDP) having excellent luminance, long lifetime, and an improved luminance saturation characteristic.

The present embodiments also provide a PDP including a phosphor layer formed of the green phosphor having excellent luminance, long lifetime, and an improved luminance saturation characteristic.

According to an aspect of the present embodiments, there is provided a green phosphor for a PDP including:
a first phosphor represented by Formula 1; and
a second phosphor including at least one of a phosphor represented by Formula 2 and a phosphor represented by Formula 3:

$(Y_{1-x-y}Gd_x)Al_3(BO_3)_4$:$Tb_y$      Formula 1

$Zn_2SiO_4$:Mn      Formula 2

$(Ba,Sr,Mg)O \cdot \alpha Al_2O_3$:Mn      Formula 3 where $0 \leq x < 1$, $0 < y < 1$, $0 < x+y < 1$ and $\alpha$ is an integer of from 1 to 23.

According to another aspect of the present embodiments, there is provided a green phosphor for a PDP including at least one compound selected from the group consisting of $Y_{1-y}Al_3(BO_3)_4$:$Tb_y$, $(Y_{1-x-y}Gd_x)Al_3(BO_3)_4$:$Tb_y$, $Y_{1-y}(Al,Ga)_3(BO_3)_4$:$Tb_y$, and a mixture thereof, wherein $0 < x \leq 0.4$, $0 < y < 1$ and $0 < x+y < 1$.

According to another aspect of the present embodiments, there is provided a PDP including: a transparent front substrate; a rear substrate which is parallel to the transparent front substrate; discharge cells defined by barrier ribs interposed between the transparent front substrate and the rear substrate; pairs of sustain electrodes extending in a first direction to correspond to the discharge cells, address electrodes extending in a second direction to cross the sustain electrodes and correspond to the discharge cells; a rear dielectric layer covering the address electrodes; red, green, and blue phosphor layers disposed inside the discharge cells; a front dielectric layer covering the pairs of sustain electrodes; and a discharge gas filled in the discharge cells, wherein the green phosphor layer is formed of a green phosphor according to the present embodiments.

BRIEF DESCRIPTION OF THE DRAWINGS

The above and other features and advantages of the present embodiments will become more apparent by describing in detail exemplary embodiments thereof with reference to the attached drawings in which.

DETAILED DESCRIPTION OF THE INVENTION

Figure 1:
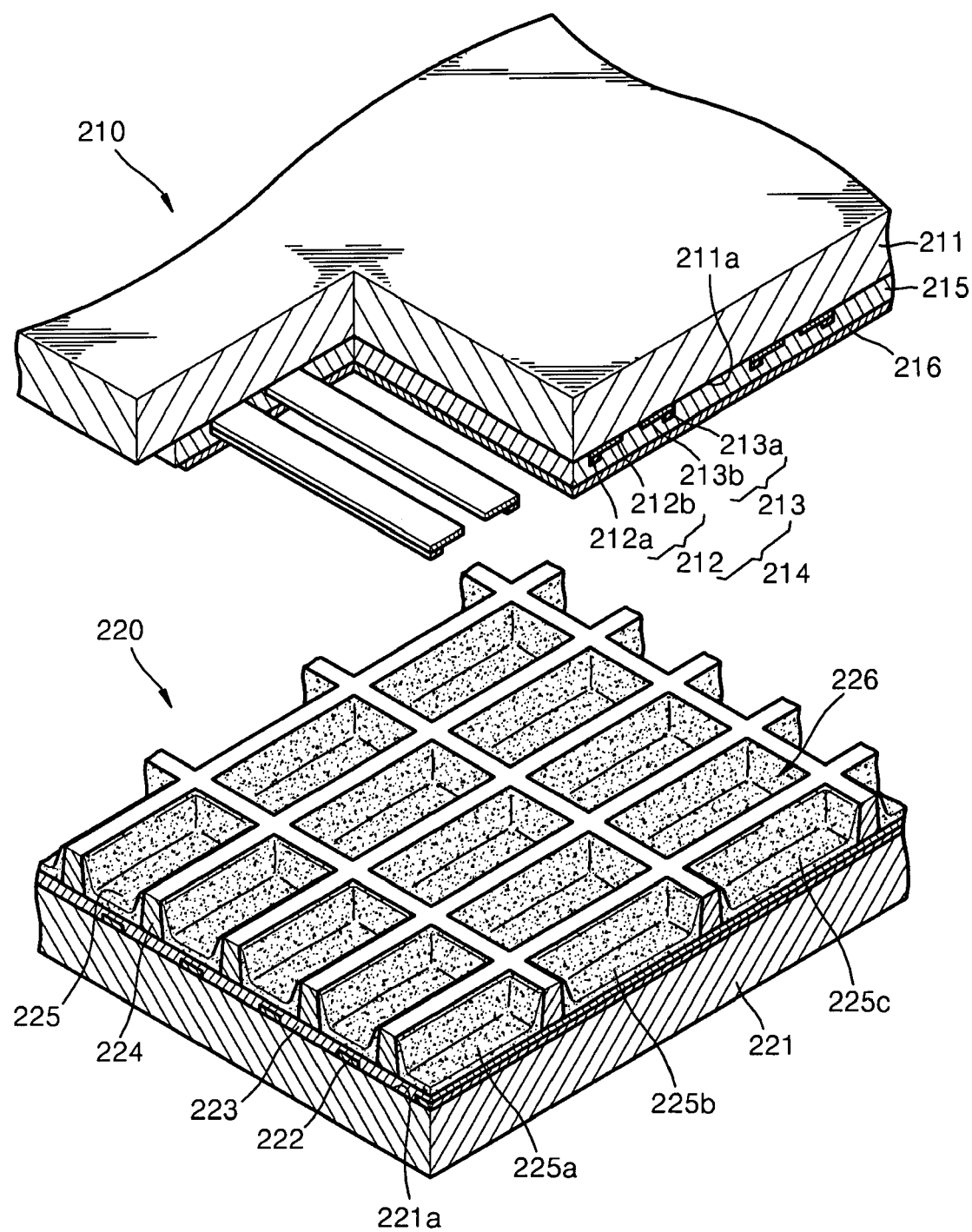
FIG. 1 is a perspective view illustrating a plasma display panel (PDP) according to an embodiment.

The present embodiments provide a green phosphor for a plasma display panel (PDP) including a phosphor represented by Formula 1:

$(Y_{1-x-y}Gd_x)Al_3(BO_3)_4$:$Tb_y$      Formula 1 where $0 \leq x < 1$, $0 < y < 1$ and $0 < x+y < 1$.

In some embodiments, the phosphor represented by Formula 1 may be $(Y_{1-x-y}Gd_x)Al_3(BO_3)_4:Tb_y$ where x is 0 and y is 0.5.

According to an embodiment, the green phosphor for a PDP may be selected from the group consisting of $Y_{1-y}Al_3(BO_3)_4:Tb_y$, $((Y_{1-x-y}Gd_x)Al_3(BO_3)_4:Tb_y$, $Y_{1-y}(Al,Ga)_3(BO_3)_4:Tb_y$, and a mixture thereof, where $0<x\leq0.4$ and $0<y<1$. Preferably the green phosphor of the present embodiments comprises $(Y_{1-x-y}Gd_x)Al_3(BO_3)_4:Tb_y$ where $0<x\leq0.4$, probably $0.2\leq x\leq0.4$ and $0<y<1$, preferably $0.45\leq y\leq0.6$.

The green phosphor of the current embodiment includes $YAl_3(BO_3)_4$ having an excellent luminance saturation characteristic as a phosphor host and Tb as an activator, and the activated phosphor has an emission peak around 540 nm. Energy efficiency can be improved by substituting Y in the phosphor host with Gd, Al or Ga.

The green phosphor for a PDP of Formula 1 is a novel green phosphor having an improved luminance saturation characteristic and increased peak luminance.

$ZnSi_2O_4$:Mn (ZSM) phosphors are widely used as a green phosphor for PDPs. When ZSM phosphors are used, luminance saturation occurs, however a further increase of luminance does not occur even though the number of sustain pulses or the discharge intensity increases significantly.

Luminance saturation is a phenomenon having non-uniform luminance in which unit luminance which is obtained from a pair of sustain pulses decreases as the number of sustain pulses increases at the same load condition. The unit luminance varies between small and large numbers of sustain discharges due to the luminance saturation.

The green phosphor of the current embodiment has an improved luminance saturation characteristic, increased peak luminance, long lifetime and excellent discharge properties.

Another embodiment provides a green phosphor for a PDP including: a first phosphor represented by Formula 1; and a second phosphor including at least one of a phosphor represented by Formula 2 and a phosphor represented by Formula 3.

$Zn_2SiO_4$:Mn                                    Formula 2

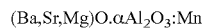

$(Ba,Sr,Mg)O.\alpha Al_2O_3$:Mn                    Formula 3

Here, α is an integer of from 1 to 23.

In the current embodiment, the first phosphor has greater luminance saturation characteristic and longer lifetime compared to conventional ZSM phosphors, and shorter decay time compared to $YBO_3$:Tb (YBT) phosphors, and thus more effectively operates compared to those conventional phosphors. A phosphor having excellent color purity is used as the second phosphor. The phosphor of Formula 2 has excellent peak luminance and color purity and the phosphor of Formula 3 has excellent color purity. Thus, a PDP having improved image quality with excellent luminance and color purity and without luminance saturation can be manufactured by using the green phosphor including the first phosphor and the second phosphor according to the current embodiment. When the green phosphor for a PDP of the current embodiment is used, a PDP having improved peak luminance, shorter decay time, longer lifetime, and better discharge properties can be prepared compared to a PDP using conventional phosphors.

The amount of the second phosphor may be from about 10 to about 100 parts by weight based on 100 parts by weight of the total amount of the first phosphor and the second phosphor.

The second phosphor may include at least one of a phosphor represented by Formula 2 and a phosphor represented by Formula 3. Further, when the second phosphor includes the phosphors of Formulae 2 and 3, the ratio of the phosphor of Formula 2 to the phosphor of Formula 3 may be in the range of about 2:1 to about 1:2.

In one embodiment, the first phosphor may be $(Y_{1-x-y}Gd_x)Al_3(BO_3)_4:Tb_y$ where x is 0 and y is 0.5, the second phosphor may be $Zn_2SiO_4$:Mn, and the ratio of the first phosphor to the second phosphor may be from about 8:2 to about 2:8.

In another embodiment, the first phosphor may be $(Y_{1-x-y}Gd_x)Al_3(BO_3)_4:Tb_y$ where x is 0 and y is 0.5, and the second phosphor may be $(Ba,Sr,Mg)O.\alpha Al_2O_3$:Mn where α is an integer of from 5 to 7, and the ratio of the first phosphor to the second phosphor may be from about 8:2 to about 2:8.

In another embodiment, the first phosphor may be $(Y_{1-x-y}Gd_x)Al_3(BO_3)_4:Tb_y$ where x is 0 and y is 0.5, and the second phosphor may be $Zn_2SiO_4$:Mn and $(Ba,Sr,Mg)O.\alpha Al_2O_3$:Mn where α is an integer of from 5 to 7, and the ratio of $Zn_2SiO_4$:Mn to $(Ba,Sr,Mg)O.\alpha Al_2O_3$:Mn may be from about 2:1 to 1:2.

The phosphors of the present embodiments may be mixed with a binder, an organic solvent, etc. to obtain a paste composition, and then the paste composition can be printed, dried and sintered to form a phosphor layer.

A PDP including a phosphor layer formed of the green phosphor of the present embodiments, according to an embodiment will now be described in detail.

The PDP according to the current embodiment includes: a transparent front substrate; a rear substrate which is parallel to the transparent front substrate; discharge cells defined by barrier ribs interposed between the transparent front substrate and the rear substrate; pairs of sustain electrodes extending in a first direction to correspond to the discharge cells; address electrodes extending in a second direction to cross the sustain electrodes and correspond to the discharge cells; a rear dielectric layer covering the address electrodes; red, green, and blue phosphor layers disposed inside the discharge cells; a front dielectric layer covering the pairs of sustain electrodes; and a discharge gas filled in the discharge cells, wherein the green phosphor may be a green phosphor represented by Formula 1, or a green phosphor including a first phosphor represented by Formula 1 and a second phosphor including at least one of a phosphor represented by Formula 2 and a phosphor represented by Formula 3.

A PDP including a phosphor layer formed of the green phosphor of the present embodiments, according to another embodiment will now be described in detail with reference to FIG. 1.

However, the PDP is not limited to the structure illustrated in FIG. 1 and can have other structures.

Referring to FIG. 1, the PDP includes a front panel 210 and a rear panel 220.

The front panel 210 includes a front substrate 211, pairs of sustain electrodes 214 that are disposed on a rear surface of the front substrate 211 and extend in a first direction to correspond to the discharge cells, a front dielectric layer 215 covering the pairs of sustain electrodes 214, and a protective layer 216.

The rear panel 220 includes a rear substrate 221 which is parallel to the front substrate 211, address electrodes 222 that are disposed on a front surface 221a of the rear substrate 221 and extend in a second direction perpendicular to the first direction to cross the pairs of sustain electrodes 214, a rear dielectric layer 223 covering the address electrodes 222, barrier ribs 224 that define a plurality of discharge cells 226 and are disposed between the front substrate 211 and the rear substrate 221, and more particularly on the rear dielectric layer 223, and a red phosphor layer 225a, a green phosphor layer 225b, and a blue phosphor layer 225c respectively formed of red, green, and blue phosphor that emit visible light by being excited by ultraviolet rays emitted from a discharge gas generated due to sustain discharges occurring in the discharge cells 226.

According to an embodiment, the green phosphor layer 225b can be formed of a phosphor layer composition including a phosphor of Formula 1, or a phosphor layer paste composition including at least one of a first phosphor of Formula 1 and a second phosphor including at least one of a phosphor represented by Formula 2 and a phosphor represented by Formula 3.

To easily print a phosphor for a PDP according to the present embodiments, the phosphor can be mixed with a binder and a solvent to obtain a paste phase composition, and then the paste phase composition can be screen printed using a screen mesh. Then the printed composition can be dried and sintered to form a phosphor layer.

The drying temperature of the printed composition may be from about 100 to about 150° C., and the sintering temperature may be from about 350 to about 600° C., preferably about 450° C., to remove organic materials of the paste phase composition.

The binder can be ethyl cellulose, and the amount of the binder may be in from about 10 to about 30 parts by weight based on 100 parts by weight of the phosphor.

The solvent can be butyl carbitol (BCA) or terpineol, and the amount of the solvent may be from about 70 to about 300 parts by weight based on 100 parts by weight of the phosphor.

The viscosity of the paste phase composition may be from about 5,000 to about 50,000 cps, and preferably about 20,000 cps.

The phosphor layer composition according to the current embodiment can further includes additives such as a dispersant, a plasticizer, an antioxidant, a leveler or the like, if necessary. In addition, all of the above additives are known to those of ordinary skill in the art and are commercially available. The amount of the additives may be from about 0.1 to about 10 parts by weight based on a total amount of the phosphor layer composition.

The red phosphor layer and the blue phosphor layer can be any red and blue phosphor layers that are conventionally used in the process of manufacturing a PDP. Examples of the red phosphor may include $(Y,Gd)BO_3$:Eu, and $Y(V,P)O_4$:Eu, and examples of the blue phosphor may include $BaMgAl_{10}O_{17}$:Eu, and $CaMgSi_2O_6$:Eu.

The front substrate 211 and the rear substrate 221 can be formed of glass, for example. The front substrate 211 may have high light transmittance.

The address electrodes 222 which are disposed on the front surface 221a of the rear substrate 221 and extend in the second direction to correspond to the discharge cells 226 may be formed of a metal having high electrical conductivity, such as Al. The address electrodes 222 are used together with a Y electrode 212 for an address discharge to occur. The purpose of the address discharge is to select discharge cells 226 for emitting light. Once an address discharge has occurred in the discharge cells 226, a sustain discharge which will be described in detail can occur.

The address electrodes 222 are covered by the rear dielectric layer 223, which prevents collision of the address electrodes 222 with charged particles that are generated during the address discharge, so that the address electrodes 222 can be protected. The rear dielectric layer 223 may be formed of a dielectric material capable of inducing discharged particles. The dielectric material can be, for example, $PbO$, $B_2O_3$, $SiO_2$, or the like.

The barrier ribs 224 defining the discharge cells 226 are interposed between the front substrate 211 and the rear substrate 221. The barrier ribs 224 secure a discharge space between the front substrate 211 and the rear substrate 221, prevent crosstalk between adjacent discharge cells 226, and enlarge the surface area of the phosphor layer 225. The barrier ribs 224 may be formed of, for example, a glass material including Pb, B, Si, Al, or O, and when required, the barrier ribs 224 may further include a filler, such as $ZrO_2$, $TiO_2$, and $Al_2O_3$, and a pigment, such as Cr, Cu, Co, Fe, or $TiO_2$.

The pairs of sustain electrodes 214 extend in the first direction, to correspond to the discharge cells 226, perpendicular to the second direction in which the address electrodes 222 extend. The pairs of sustain electrodes 214 include pairs of sustain electrodes 212 and 213. The pairs of sustain electrodes 214 are disposed parallel to each other at predetermined intervals on the front substrate 211. One of the sustain electrodes 213 is an X electrode and the other sustain electrode 212 is a Y electrode. The sustain discharge occurs due to a potential difference between the X electrode and the Y electrode.

The X electrode and the Y electrode include transparent electrodes 213b and 212b and bus electrodes 213a and 212a, respectively. In some cases, however, the bus electrodes 213a and 212a can be solely used to form a scanning electrode and a common electrode.

The transparent electrodes 213b and 212b may be formed of a conductive and transparent material, so that the light emitted from the phosphor can pass through the front substrate 211 without being blocked. The conductive and transparent material can be indium tin oxide (ITO). However, since the conductive and transparent material, such as ITO, has a high resistance, and when the sustain electrodes 214 are formed of the transparent electrodes 213b and 212b, the sustain electrodes 214 have a large voltage drop in a lengthwise direction of the transparent electrodes 213b and 212b, the power consumption of the PDP increases and the response speed of images reduces. In order to prevent these problems, the bus electrodes 213a and 212a are formed of a highly conductive metal, such as Ag, and are formed at outer edges of the transparent electrodes 213b and 212b.

The sustain electrodes 212 and 213 are covered by the front dielectric layer 215. The front dielectric layer 215 electrically insulates the X electrodes from the Y electrodes, and prevents collisions of charged particles with the sustain electrodes 212 and 213, so that the sustain electrodes 212 and 213 are protected. The front dielectric layer 215 is formed of a dielectric material having high light transmittance, such as PbO, $B_2O_3$, or $SiO_2$.

The protective layer 216 can be formed on the front dielectric layer 215. The protective layer 216 prevents collisions of charged particles with the front dielectric layer 215 during the sustain discharge so that the front dielectric layer 215 can be protected, and generates many secondary electrons during the sustain discharge. The protective layer 216 may be formed of MgO, for example.

The discharge cells 226 are filled with a discharge gas. The discharge gas can be, for example a gaseous mixture of Ne and Xe in which the amount of Xe is from about 5 to about 10%. When needed, a part of Ne can be replaced with He.

The present embodiments will be described in further detail with reference to the following examples. These examples are for illustrative purposes only and are not intended to limit the scope of the present embodiments.

EXAMPLE 1

40 parts by weight of $Y_{0.5}Al_3(BO_3)_4$:$Tb_{0.5}$, 50 parts by weight of butyl carbitol acetate and 8 parts by weight of ethyl cellulose were mixed. The mixture was mixed with a vehicle to prepare a green phosphor layer paste composition. The prepared green phosphor layer paste composition was screen printed in discharge cells of a PDP, dried, and then sintered to prepare a green phosphor layer. In the PDP, a discharge gas included 93% by volume of Ne and 7% by volume of Xe.

EXAMPLE 2

A green phosphor layer was prepared in the same manner as in Example 1, except that 20 parts by weight of $Y_{0.5}Al_3(BO_3)_4:Tb_{0.5}$ and 20 parts by weight of $Zn_2SiO_4:Mn$ were used instead of 40 parts by weight of $Y_{0.5}Al_3(BO_3)_4:Tb_{0.5}$.

EXAMPLE 3

A green phosphor layer was prepared in the same manner as in Example 1, except that that 20 parts by weight of $Y_{0.5}Al_3(BO_3)_4:Tb_{0.5}$ and 20 parts by weight of $(Ba,Mg)OAl_2O_3:Mn$ were used instead of 40 parts by weight of $Y_{0.5}Al_3(BO_3)_4:Tb_{0.5}$.

EXAMPLE 4

A green phosphor layer was prepared in the same manner as in Example 1, except that that 20 parts by weight of $Y_{0.5}Al_3(BO_3)_4:Tb_{0.5}$, 10 parts by weight of $Zn_2SiO_4:Mn$ and 10 parts by weight of $(Ba,Mg)OAl_2O_3:Mn$ were used instead of 40 parts by weight of $Y_{0.5}Al_3(BO_3)_4:Tb_{0.5}$.

EXAMPLE 5

6% by weight of ethylene cellulose was dissolved in 54% by weight of a mixed organic solvent having butyl carbitol acetate and terpineol (30:70 by volume). 40% by weight of $Y_{0.5}Al_3(BO_3)_4:Tb_{0.5}$ was added thereto and the mixture was stirred to prepare a green phosphor composition. The prepared green phosphor composition was coated on emission cells and sintered to prepare a PDP having a green phosphor layer.

EXAMPLE 6

A green phosphor layer was prepared in the same manner as in Example 1, except that $(Y_{0.3}Gd_{0.2})Al_3(BO_3)_4:Tb_{0.5}$ was used.

EXAMPLE 7

A green phosphor layer was prepared in the same manner as in Example 1, except that $Y_{0.5}(Al,Ga)_3(BO_3)_4:Tb_{0.5}$ was used.

COMPARATIVE EXAMPLE 1

A green phosphor layer was prepared in the same manner as in Example 1, except that 100% of $Zn_2SiO_4:Mn$ was used instead of $Y_{0.5}Al_3(BO_3)_4:Tb_{0.5}$.

COMPARATIVE EXAMPLE 2

A green phosphor layer was prepared in the same manner as in Example 1, except that 100% of $YBO_3:Tb$ was used instead of $Y_{0.5}Al_3(BO_3)_4:Tb_{0.5}$.

COMPARATIVE EXAMPLE 3

A green phosphor layer was prepared in the same manner as in Example 1, except that 100% of $(Ba,Mg)OAl_2O_3:Mn$ was used instead of $Y_{0.5}Al_3(BO_3)_4:Tb_{0.5}$.

COMPARATIVE EXAMPLE 4

A green phosphor layer was prepared in the same manner as in Example 5, except that $Zn_2SiO_4:Mn$ was used.

Measurement and Result

Color purity, relative luminance, decay time, lifetime, luminance, and discharge voltage of the green phosphor layers prepared according to Examples 1 to 4 and Comparative Examples 1 to 3 were measured using devices and methods as follows.

(1) color purity: device: CA100+, Minolta (2) relative luminance: device: CA100+, Minolta (3) decay time: time taken until luminance is reduced to 1/10

(4) lifetime: luminance maintenance rate over a long period of time of aging panels, device: CA100+, Minolta (5) luminance saturation: luminance according to the number of sustain pulses, device: CA100+, Minolta (6) discharge voltage: opposed discharge voltage and VTC curve The green phosphor layer using $Y_{0.5}Al_3(BO_3)_4:Tb_{0.5}$ according to Example 1 had similar luminance and color purity compared to using $YBO_3:Tb$, and excellent discharge properties and long lifetime.

The decay time of the green phosphor layer of Example 1 was 6 ms. The decay times of the green phosphor layers of Comparative Example 1, Comparative Example 2, and Comparative Example 3 were in the ranges of 9 to 10 ms, 12 to 14 ms, and 16 to 18 ms, respectively.

The luminance saturation characteristics of the green phosphor layers according to Examples 1 to 4 were excellent, being 90 to 95% in Example 1, 73 to 87% in Example 2, 82 to 90% in Example 3, and 75 to 85% in Example 4. On the other hand, the luminance saturation characteristic of the green phosphor layer according to Comparative Example 1 was 60 to 65%. The luminance saturation characteristics of the green phosphor layers according to Comparative Example 2 and Comparative Example 3 were 90 to 95%, and 80 to 85%, respectively.

Figure 2:
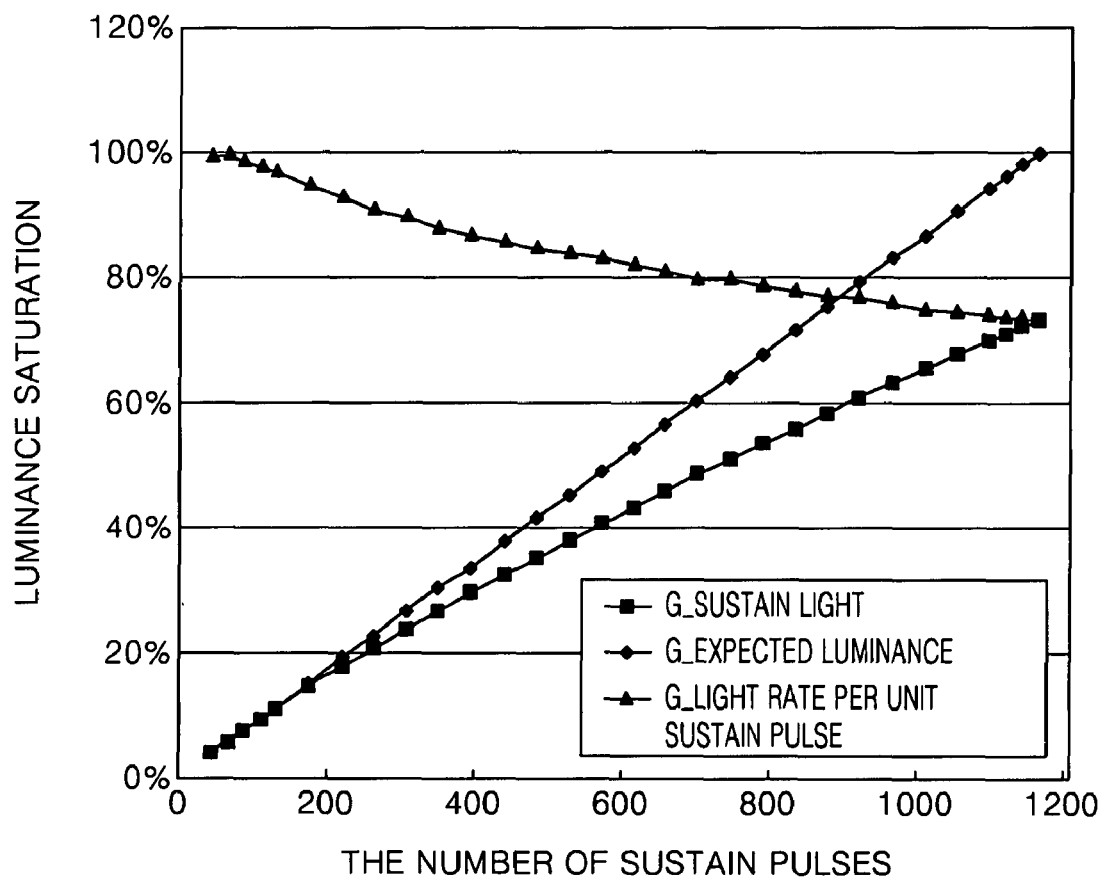
FIG. 2 is a graph illustrating the luminance saturation characteristic of a PDP including a phosphor layer formed of $Zn_2SiO_4$:Mn.
Figure 3:
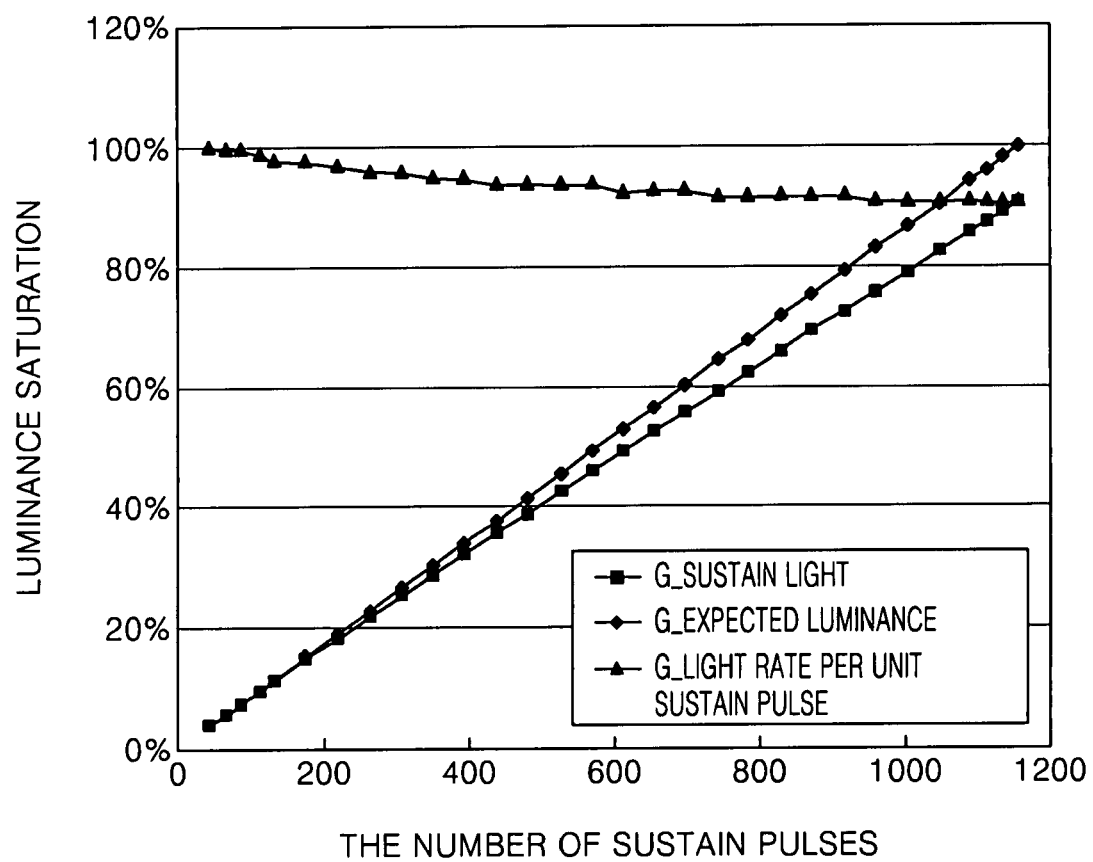
FIG. 3 is a graph illustrating the luminance saturation characteristic of a PDP including a phosphor layer formed of $Y_{1-y}Al_3(BO_3)_4$:$Tb_y$.

FIG. 3 is a graph illustrating the luminance saturation characteristic of the green phosphor layer according to Example 1 and FIG. 2 is a graph illustrating the luminance saturation characteristic of the green phosphor layer according to Comparative Example 1.

Referring to FIG. 3, the luminance saturation characteristic of the green phosphor layer according to Example 1, that is, the green phosphor layer using $Y_{0.5}Al_3(BO_3)_4:Tb_{0.5}$ was 91%, and referring to FIG. 2, the luminance saturation characteristic of the green phosphor layer according to Comparative Example 1, that is, the green phosphor layer using $ZnSi_2O_4:Mn$ was 71%. Thus, the green phosphor for a PDP according to the present embodiments has an excellent luminance saturation characteristic, and thus bright room contrast may increase.

The measured properties of the green phosphors according to Examples 1 to 4 and Comparative Examples 1 to 3 are shown in Table 1.

TABLE 1

|  | color purity | luminance | decay time | lifetime | luminance saturation | discharge voltage |
|---|---|---|---|---|---|---|
| Example 1 | x | ○ | □ | □ | □ | □ |
| Example 2 | ○ | ○ | ○ | ○ | ○ | ○ |
| Example 3 | ○ | Δ | ○ | ○ | ○ | ○ |
| Example 4 | ○ | ○ | ○ | ○ | ○ | ○ |
| Comparative Example 1 | ○ | □ | ○ | Δ | x | x |
| Comparative Example 2 | x | ○ | Δ | □ | □ | □ |
| Comparative Example 3 | □ | Δ | x | x | ○ | □ |

(□: excellent, ○: good, Δ: fair, x: poor)

As shown in Table 1, the green phosphor layer according to Example 1 had poor color purity, but excellent properties in decay time, lifetime, luminance saturation, and discharge voltage. The green phosphor layers according to Examples 2 to Example 4 had good properties in color purity, decay time, lifetime, luminance saturation, and discharge voltage.

The luminance of the green phosphor layers according to Examples 5 to 7 was measured based on 100% of luminance of the green phosphor layer of Comparative Example 4. The results are shown in Table 2. Further, the luminance saturation characteristics of the green phosphor layers according to Examples 5 to 7 and Comparative Example 4 was measured based on 100% of the purest color which is a standard. The results are shown in Table 2.

TABLE 2

|  | Relative luminance (%) | Luminance saturation characteristic (%) |
|---|---|---|
| Example 5 | 95 | 86 |
| Example 6 | 105 | 92 |
| Example 7 | 98 | 84 |
| Comparative Example 4 | 100 | 77 |

Figure 4:
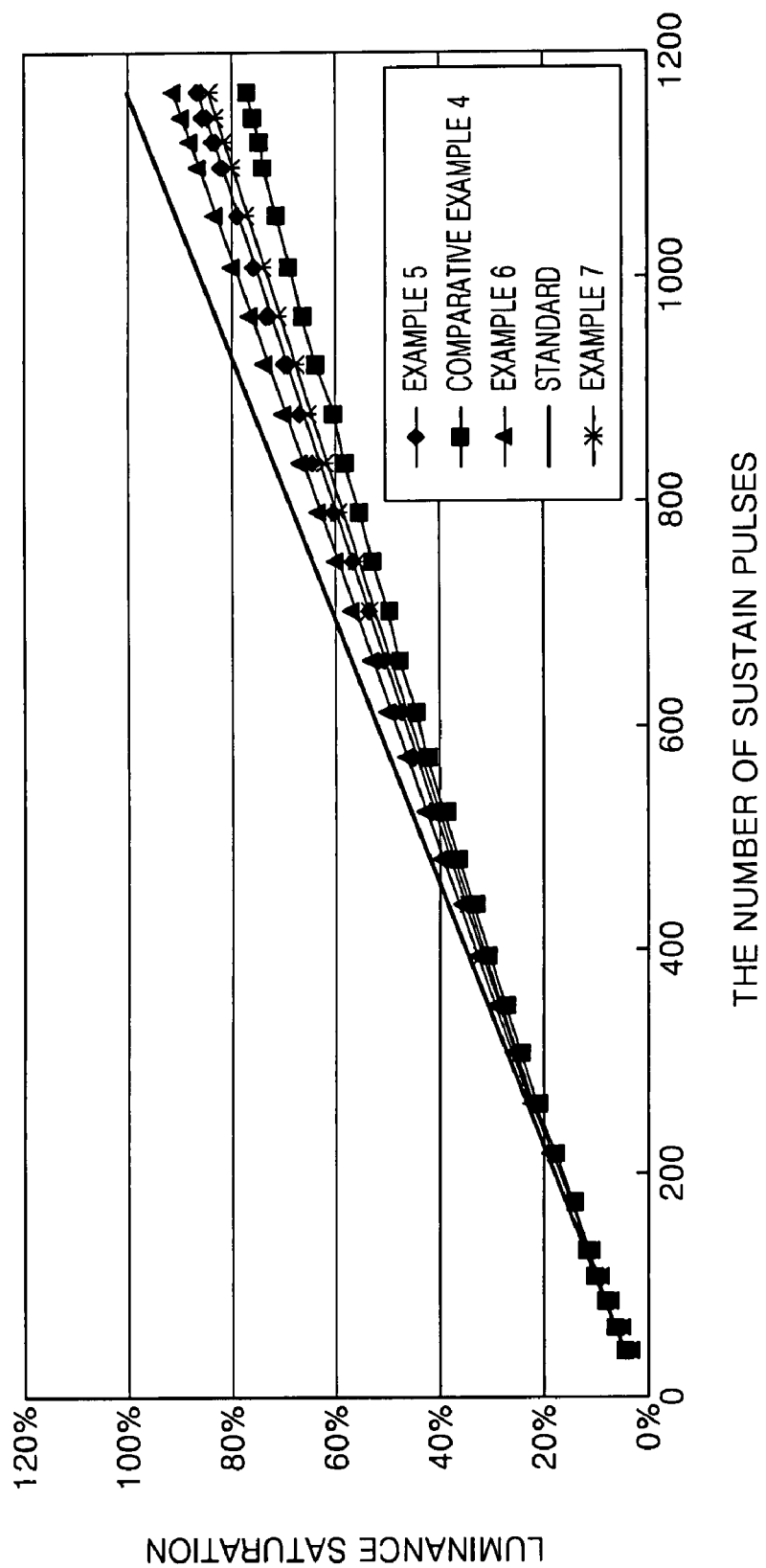
FIG. 4 is a graph illustrating the luminance saturation characters of green phosphors according to Examples 1 to 3 and Comparative Example 1.

In addition, the luminance saturation characteristics of the green phosphor layers according to Examples 5 to 7 and Comparative Example 4 were measured according to the number of sustain pulses. The results are illustrated in FIG. 4, and the standard luminance saturation value was also illustrated in FIG. 4. As illustrated in FIG. 4, the green phosphor layers of Examples 5 through 7 had closer luminance saturation to the standard saturation value compared to that of Comparative Example 4, and thus show pure color.

The green phosphor for a PDP of the present embodiments has an improved luminance saturation characteristic, and can also be mixed with conventionally used green phosphors. Image quality can be improved according to a mixing rate of the green phosphor of the present embodiments and conventionally used green phosphors since color reproduction range widens and luminance does not decrease compared to using the conventional green phosphors.

While the present embodiments have been particularly shown and described with reference to exemplary embodiments thereof, it will be understood by those of ordinary skill in the art that various changes in form and details may be made therein without departing from the spirit and scope of the present embodiments as defined by the following claims.

What is claimed is:

1. A green phosphor for a plasma display panel comprising:
a first phosphor represented by Formula 1;

$(Y_{1-x-y}Gd_x)Al_3(BO_3)4\,Tb_y$, and    Formula 1 a second phosphor comprising at least one of a phosphor represented by Formula 2 and a phosphor represented by Formula 3:

$Zn_2SiO_4:Mn$    Formula 2

$(Ba,Sr,Mg)O \cdot \alpha Al_2O_3:Mn$    Formula 3 wherein $0 \leq x < 1$, $0 < y < 1$, $0 < x+y < 1$ and $\alpha$ is an integer of from 1 to 23.

2. The green phosphor of claim 1, wherein the amount of the second phosphor is from about 10 to about 100 parts by weight based on 100 parts by weight of the total amount of the first phosphor and the second phosphor.

3. The green phosphor of claim 1, wherein the second phosphor is the phosphor represented by Formula 2.

4. The green phosphor of claim 1, wherein the second phosphor is the phosphor represented by Formula 3.

5. The green phosphor of claim 1, wherein the second phosphor comprises the phosphors represented by Formula 2 and 3.

6. The green phosphor of claim 5, wherein the ratio of the phosphor of Formula 2 to the phosphor of Formula 3 is from about 2:1 to about 1:2.

7. The green phosphor of claim 1, wherein the first phosphor is $(Y_{1-x-y}Gd_x)Al_3(BO_3)_4:Tb_y$, wherein x is 0 and y is 0.5, the second phosphor is $Zn_2SiO_4:Mn$, and the ratio of the first phosphor to the second phosphor is from about 8:2 to about 2:8.

8. The green phosphor of claim 1, wherein the first phosphor is $((Y_{1-x-y}Gd_x)Al_3(BO_3)_4:Tb_y$, wherein x is 0 and y is 0.5, the second phosphor is $(Ba,Sr,Mg)O \cdot \alpha Al_2O_3:Mn$ wherein $\alpha$ is an integer of from 5 to 7, and the ratio of the first phosphor to the second phosphor is from about 8:2 to about 2:8.

9. The green phosphor of claim 1, wherein the first phosphor is $(Y_{1-x-y}Gd_x)Al_3(BO_3)_4:Tb_y$, and y is 0.5 wherein x is 0, and the second phosphor comprises $Zn_2SiO_4:Mn$ and $(Ba,Sr,Mg)O \cdot \alpha Al_2O_3:Mn$ where $\alpha$ is an integer of from 5 to 7, and the ratio of the $Zn_2SiO_4:Mn$ to $(Ba,Sr,Mg)O \cdot \alpha Al_2O_3:Mn$ is from about 2:1 to about 1:2.

10. A green phosphor for a plasma display panel comprising at least one compound selected from the group consisting of $Y_{1-y}Al_3(BO_3)_4:Tb_y$, $(Y_{1-x-y}Gd_x)Al_3(BO_3)_4:Tb_y$, $Y_{1-y}(Al,Ga)_3(BO_3)_4:Tb_y$ and a mixture thereof, wherein $0 < x \leq 0.4$, $0 < y < 1$ and $0 < x+y < 1$.

11. The green phosphor of claim 10, comprising $(Y_{1-x-y}Gd_x)Al_3(BO_3)_4:Tb_y$, wherein $0 < x \leq 0.4$, $0 < y < 1$ and $0 < x+y < 1$.

12. The green phosphor of claim 10, comprising $(Y_{1-x-y}Gd_x)Al_3(BO_3)_4:Tb_y$, wherein $0.2 \leq x \leq 0.4$, $0 < y < 1$ and $0 < x+y < 1$.

13. A plasma display panel comprising:
a transparent front substrate;
a rear substrate which is parallel to the transparent front substrate;
discharge cells defined by barrier ribs interposed between the transparent front substrate and the rear substrate;
pairs of sustain electrodes extending in a first direction to correspond to the discharge cells;
address electrodes extending in a second direction to cross the sustain electrodes and correspond to the discharge cells;
a rear dielectric layer covering the address electrodes;
red, green, and blue phosphor layers disposed inside the discharge cells;
a front dielectric layer covering the pairs of sustain electrodes;
and a discharge gas filled in the discharge cells, wherein the green phosphor layer is formed of a green phosphor according to claim 1.

14. The plasma display panel of claim 13, wherein the green phosphor layer is formed of a green phosphor according to claim 2.

15. The plasma display panel of claim 13, wherein the green phosphor layer is formed of a green phosphor according to claim 3.

16. The plasma display panel of claim 13, wherein the green phosphor layer is formed of a green phosphor according to claim 4.

17. The plasma display panel of claim 13, wherein the green phosphor layer is formed of a green phosphor according to claim 5.

18. The plasma display panel of claim 13, wherein the green phosphor layer is formed of a green phosphor according to claim 6.

19. The plasma display panel of claim 13, wherein the green phosphor layer is formed of a green phosphor according to claim 7.

20. The plasma display panel of claim 13, wherein the green phosphor layer is formed of a green phosphor according to claim 8.

21. The plasma display panel of claim 13, wherein the green phosphor layer is formed of a green phosphor according to claim 9.

22. A plasma display panel comprising:
a transparent front substrate;
a rear substrate which is parallel to the transparent front substrate;
discharge cells defined by barrier ribs interposed between the transparent front substrate and the rear substrate;
pairs of sustain electrodes extending in a first direction to correspond to the discharge cells;
address electrodes extending in a second direction to cross the sustain electrodes and correspond to the discharge cells;
a rear dielectric layer covering the address electrodes;
red, green, and blue phosphor layers disposed inside the discharge cells;
a front dielectric layer covering the pairs of sustain electrodes;
and a discharge gas filled in the discharge cells, wherein the green phosphor layer is formed of a green phosphor according to claims 10.

23. The plasma display panel of claim 22, wherein the green phosphor layer is formed of a green phosphor according to claim 11.

24. The plasma display panel of claim 22, wherein the green phosphor layer is formed of a green phosphor according to claim 12.

* * * * *